(12) United States Patent
Annequin et al.

(10) Patent No.: US 10,483,701 B2
(45) Date of Patent: Nov. 19, 2019

(54) ELECTRICAL CONNECTION ASSEMBLY WITH ELECTRICAL CONNECTOR MOUNTED AND OVERMOLDED ON AN ELECTRIC CABLE, ASSOCIATED PRODUCTION METHOD

(71) Applicant: RAYDIALL, Voiron (FR)

(72) Inventors: Sébastien Annequin, Saint Nicolas de Macherin (FR); Adrien Brunet, Sassenage (FR)

(73) Assignee: RAYDIALL, Voiron (FR)

( * ) Notice: Subject to any disclaimer, the term of this patent is extended or adjusted under 35 U.S.C. 154(b) by 0 days.

(21) Appl. No.: 16/354,740

(22) Filed: Mar. 15, 2019

(65) Prior Publication Data

US 2019/0288464 A1 Sep. 19, 2019

(30) Foreign Application Priority Data

Mar. 16, 2018 (FR) ..................... 18 52294

(51) Int. Cl.
| | |
|---|---|
| *H01R 9/05* | (2006.01) |
| *H01R 24/56* | (2011.01) |
| *H01R 13/514* | (2006.01) |
| *H01R 13/52* | (2006.01) |
| *H01R 4/12* | (2006.01) |
| *H01R 43/20* | (2006.01) |
| *H01R 4/18* | (2006.01) |

(52) U.S. Cl.
CPC ............. *H01R 24/56* (2013.01); *H01R 4/12* (2013.01); *H01R 4/18* (2013.01); *H01R 9/0503* (2013.01); *H01R 13/514* (2013.01); *H01R 13/5202* (2013.01); *H01R 43/20* (2013.01)

(58) Field of Classification Search
CPC .... H01R 9/0518; H01R 17/12; H01R 13/432; H01R 4/02
USPC ................................ 439/582, 578, 747, 874
See application file for complete search history.

(56) References Cited

U.S. PATENT DOCUMENTS

| | | | |
|---|---|---|---|
| 4,685,758 | A | 8/1987 | Yoshida |
| 4,741,708 | A | 5/1988 | Yoshida |
| 5,021,010 | A | 6/1991 | Wright |
| 5,833,495 | A | 11/1998 | Ito |
| 5,882,226 | A | 3/1999 | Bell et al. |
| 7,160,150 | B2 | 1/2007 | Annequin |
| 7,510,433 | B2 | 3/2009 | Blakborn et al. |

(Continued)

FOREIGN PATENT DOCUMENTS

| | | |
|---|---|---|
| EP | 0 207 322 A1 | 1/1987 |
| EP | 0 818 854 A1 | 1/1998 |

(Continued)

OTHER PUBLICATIONS

French Preliminary Search Report dated Nov. 20, 2018 from Corresponding French Application No. FR 1852294.

*Primary Examiner* — Phuong Chi Thi Nguyen
(74) *Attorney, Agent, or Firm* — Pearne & Gordon LLP

(57) ABSTRACT

The present invention basically involves replacing all the mechanical protection (corrugated tube, cover) and sealing (annular seals) parts that are mechanically fitted in electrical connection solutions, in particular for coaxial connection, of the prior art with a joint directly overmolded on the conductive jacket (ferrule, shell or two half-shells), partly inside the connector housing and around the part of the outer sheath of the cable that is near the housing.

14 Claims, 8 Drawing Sheets

(56) References Cited

U.S. PATENT DOCUMENTS

| | | | | |
|---|---|---|---|---|
| 8,182,285 | B2* | 5/2012 | Annequin | H01R 24/54 |
| | | | | 439/582 |
| 9,837,752 | B2* | 12/2017 | Rodrigues | H01R 9/0521 |
| 10,038,284 | B2* | 7/2018 | Krenceski | H01R 9/0524 |
| 10,211,547 | B2* | 2/2019 | Burris | H01R 9/0524 |
| 10,396,508 | B2* | 8/2019 | Burris | H01R 9/05 |
| 10,411,393 | B2* | 9/2019 | Rodrigues | H01R 9/0524 |
| 2003/0173707 | A1 | 9/2003 | Becker et al. | |
| 2014/0200645 | A1* | 7/2014 | Vaishya | H01R 4/187 |
| | | | | 607/137 |
| 2018/0034172 | A1 | 2/2018 | Singhammer et al. | |

FOREIGN PATENT DOCUMENTS

| | | |
|---|---|---|
| EP | 1 653 574 A1 | 5/2006 |
| WO | 02/16472 A1 | 2/2002 |
| WO | 2013/022422 A1 | 2/2013 |

* cited by examiner

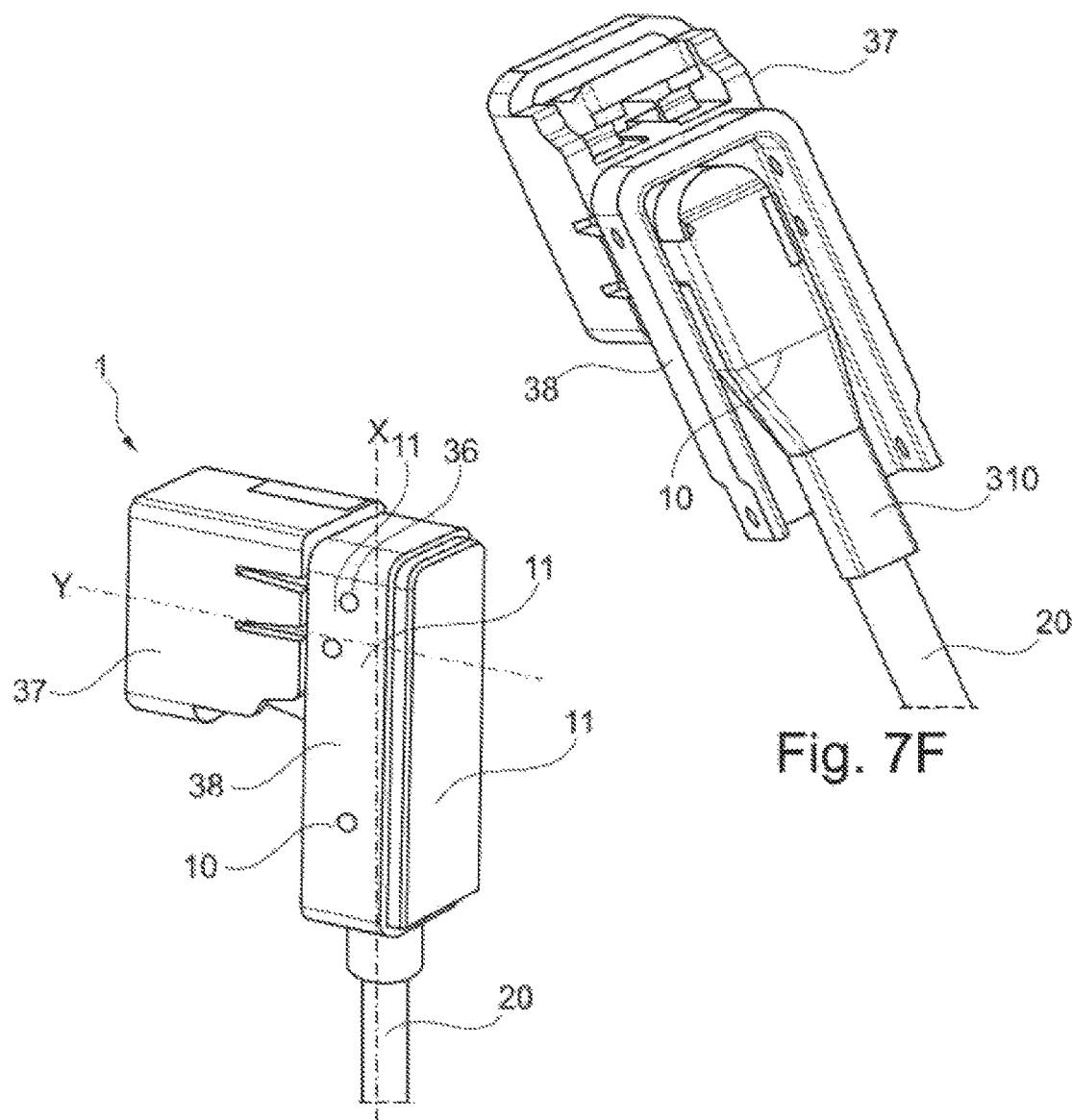
Fig. 7F
Fig. 7G
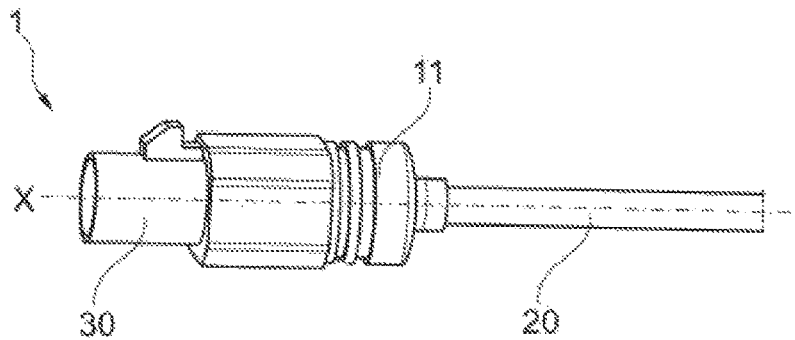
Fig. 8

ELECTRICAL CONNECTION ASSEMBLY WITH ELECTRICAL CONNECTOR MOUNTED AND OVERMOLDED ON AN ELECTRIC CABLE, ASSOCIATED PRODUCTION METHOD

TECHNICAL FIELD

The present invention relates to an electrical connection assembly comprising an electrical connector mounted and overmolded on an electric cable, as well as to the associated production method.

It particularly aims to lower the cost and reduce the dimensions of this type of connection assembly.

The invention still addresses the mechanical constraints and environmental requirements that are associated with the USCAR and ISO standards relating to connectors and is thus more specifically applicable to coaxial connectors intended for the motor vehicle field, such as FAKRA, USCAR coaxial connectors. It is also applicable to twisted pair connectors, such as HSD (High Speed Data) or HMTD (High speed Modular Twisted pair Data) connectors.

The invention also allows electrical connectors to be provided that comply with the color coding and keying system for applications of the motor vehicle field, whereby a combination of colors allows a single connection to be made between a male connector and a female connector for the same type of connection (GPS, wireless, e.g. Bluetooth®, "Digital Audio Broadcasting" (DAB), Wi-Fi, ADAS, protocol, etc.).

PRIOR ART

An electrical connector is mounted on an electric cable and comprises an end, from which said electric cable emerges.

Patent EP 1653574 B1, in the name of the Applicant, discloses an advantageous assembly using crimping between, on the one hand, the central conductor of a coaxial electric cable and the central contact of a coaxial connector and, on the other hand, between an outer contact and the metal braid and the sheath of the cable, respectively.

There are several known solutions for achieving the mechanical protection and the seal between a coaxial connector and a coaxial cable on which the connector is mounted, while addressing the mechanical and environmental constraints associated with motor vehicle applications.

U.S. Pat. No. 7,510,433 B2 discloses a first mechanical protection and sealing solution for a straight connector. FIG. 1 shows a coaxial connector 3 as disclosed in this patent. The electrical insulating housing 30 of this connector 3 houses and retains an outer contact 31 in the form of a tube, on which a crimping sleeve 32 is crimped with the metal braid of the coaxial cable (not shown). Inside the housing 30, a first sealing sleeve 4 completely surrounds the outer contact 31. Two sealing O-rings 5 respectively arranged at the end and around the outer contact 31 and around the first sealing sleeve 4 complete the seal that is obtained by said sleeve inside the housing 30. An annular seal 6 attached via the crimping sleeve 32 completes the seal around the end of the coaxial cable. Finally, the rear end of the housing 30 is extended by a tubular part 33, in which tabs 34, which are radially rotated inwardly, lock a corrugated shaped protection tube 7 through resilient snap-fitting, which tube surrounds the coaxial cable and thus acts as mechanical protection thereof.

A second solution is disclosed, for example, in patent application US 2018/0034172 in relation to a 90° elbow connector. FIG. 2 shows a coaxial connection assembly 1 as disclosed in this application. The coaxial cable 2 is housed inside the part of the housing 30 of the connector 3 that extends along a longitudinal axis X, at 90° in relation to the other curved part of the housing 30 of the connector.

Without explaining the connection details, the outer conductor 21 of the coaxial cable 2 that forms a shield is in peripheral contact with the outer contact 31 of the connector 2, whereas the central conductor 22 of the cable 2 is in peripheral contact with the central contact 35 of the connector in the part thereof that is along the X axis.

The mechanical protection of the cable 2 and the seal at the end of the housing 30 of the connector 3 in this case is provided by an annular seal 6 that is arranged inside the housing around the outer insulating sheath 20 of the cable 2. A protection cover 8, which is attached to the housing 30 by snap-fitting, closes up the space behind the seal 6.

A similar solution is shown on a straight connector in FIGS. 3 and 3A. FIG. 3A firstly shows details of the assembly of the connector 3, with a longitudinal axis X, on the coaxial cable 2.

The outer contact 31 is mounted in the housing 30 with a portion 310 that is crimped around the outer sheath 20 of the coaxial cable 2. Furthermore, a portion 311 of the outer contact 31 is crimped around the metal shielding braid 21 of the cable 2 that surrounds the dielectric 23 thereof.

The central contact 32 is mounted inside the outer contact 31 with interpositioning of an electrically insulating body 9 and with a portion 320 that is crimped around the bare free end of the central conductor 22 of the coaxial cable 2.

Inside the housing 30, a metal ferrule 10 surrounds the central contact 32 and the outer contact 31 along the X axis, between the tubular part of the outer contact 31 and the portion 311 thereof that is crimped around the metal braid 21, by forming a substantially closed cavity C.

In order to provide the mechanical protection and sealing on the rear part 300 of the housing 30, a protection cover 8 closes the rear part 300 of the housing 30 around the cable 2.

More specifically, as shown in FIG. 3, the protection cover 8 is snap-fitted on the rear part 300 of the housing 30 by means of resilient lugs 80 that snap-fit around projections 36 provided to this end on the outer periphery of the rear part 300 of the housing 30.

An annular seal 6 is shrink-fitted around the sheath 20 of the cable 2 and provides the seal between the cover and the sheath of the cable 2.

In order to complete the seal between the housing 30 and the cover 8, two additional annular seals 5 are provided, one of which is arranged at the end of the cover in abutment against an internal shoulder of the housing and the other one of which is arranged around the tubular part of the cover 8.

It is easy to understand from reading the above that the existing solutions involve implementing numerous additional parts in order to provide the mechanical protection and/or the seal between a coaxial cable and a coaxial connector mounted on said coaxial cable.

Furthermore, these solutions involve a significant cost and a spatial requirement in addition to that required for the connector per se, which may be substantial.

Therefore, a requirement exists for improving connection assemblies with an electrical connector mounted on an electric cable, in particular with a coaxial connector mounted on a coaxial cable, in order to reduce the number of parts required for sealing and/or for mechanical protection and to reduce the associated cost and spatial requirement.

The aim of the invention is to at least partly address this requirement.

DISCLOSURE OF THE INVENTION

To this end, the aim of the invention is an electrical connection assembly comprising:
- an electric cable comprising:
  - at least one central conductor;
  - an electrically insulating outer sheath surrounding the central conductor(s);
- an electrical connector comprising:
  - a housing;
  - an outer contact extending along at least one longitudinal axis (X), the outer contact being mounted in the housing;
  - at least one central contact extending at least along the longitudinal axis (X), the central contact(s) being mounted inside the outer contact with interpositioning of an electrically insulating body, the central contact(s) being provided with at least one portion that is crimped around the bare free end of the central conductor(s) of the cable;
  - an electrically conductive jacket surrounding the inside of the housing, the central contact(s) and the outer contact at least over the length, along the X axis, of the portion that is crimped around the free crimped end of the central conductor(s), by forming a cavity that is practically or fully closed;
- a sealing and mechanical retention joint overmolded both between the jacket and a part of the housing, between the housing part and part of the sheath of the cable, and around said parts.

The cable may comprise a dielectric surrounding each central conductor, an outer ground conductor, optionally with an additional electromagnetic shielding surrounding the dielectric, the sheath then surrounding the outer conductor with the shielding, if applicable.

The housing may be electrically insulating or electrically conductive.

According to one embodiment, the cable and the connector are coaxial.

According to another embodiment, the cable is formed by one or more pairs of twisted central conductors.

Preferably, the cavity is devoid of the material of the overmolded joint. Thus, according to the invention, the cavity is free of the overmolded material of the sealing and mechanical retention joint.

The housing part may comprise one or more through-opening(s) completely filled by the overmolded joint.

According to one advantageous embodiment, the assembly comprises:
- the electric cable comprises, around at least one central conductor, a dielectric and a metal shielding braid surrounding the dielectric and surrounded by the outer sheath;
- the outer contact comprises a portion that is crimped around the outer sheath of the cable and/or a portion that is crimped around the metal braid of the cable;
- the jacket also surrounds the central contact and the outer contact over the length of the portion that is crimped around the metal braid.

The outer contact may be formed by the one and the same part that is obtained by cutting and rolling a metal strip.

Similarly, the jacket may be formed by the one and the same part (ferrule) that is obtained by cutting and rolling a metal strip.

According to a first advantageous embodiment:
- the connector housing is formed by a single straight part extending along the longitudinal axis (X);
- the joint is overmolded between the jacket and the rear part of the housing and between the rear part of the housing and part of the sheath of the coaxial cable by being distributed around said cable and the rear part of the housing.

According to a second advantageous embodiment:
- the connector is elbow shaped with an elbow between the longitudinal axis (X) and another longitudinal axis (Y), preferably 90° relative to each other;
- the connector housing comprising:
  - a coding housing extending along the other longitudinal axis (Y);
  - a curved sleeve with the same elbow shape as that of the connector, the sleeve being assembled with the housing body, the sleeve housing the jacket;
- the joint is overmolded between the jacket and the inner space of the sleeve by closing said sleeve around part of the sheath of the electric cable.

According to this second embodiment, the sleeve may be assembled with the coding housing along a pivot link around the other axis (Y).

A further aim of the invention is a method for producing an electrical connection assembly, comprising the following steps:
- a/ supplying an electrical connection assembly comprising:
  - an electric cable comprising:
    - at least one central conductor;
    - an electrically insulating outer sheath surrounding the central conductor(s);
  - an electrical connector comprising:
    - a housing;
    - an outer contact extending along at least one longitudinal axis (X), the outer contact being mounted in the housing;
    - at least one central contact extending at least along the longitudinal axis (X), the central contact(s) being mounted inside the outer contact with interpositioning of an electrically insulating body, the central contact(s) being provided with at least one portion that is crimped around the bare free end of the central conductor of the cable;
    - an electrically conductive jacket surrounding the inside of the housing, the central contact(s) and the outer contact at least over the length, along the X axis, of the portion that is crimped around the free crimped end of the central conductor(s), by forming a cavity that is practically or fully closed;
- b/ producing an overmold made of at least one polymer material, using a technique called low pressure overmolding, both between the jacket and part of the housing, between the housing part and part of the cable sheath, and around said parts.

Preferably, the step b/ is implemented so that the cavity is devoid of the polymer material of the overmold.

More preferably, the step b/ is implemented as follows:
- b1/ initial injection of the polymer material using partial filling of the final volume defining the overmolded joint;
- b2/ stopping the injection of b1/;

b3/ final injection of the polymer material, so as to complete the final volume defining the overmolded joint.

The conductive jacket, which is typically metal, may be in the form of a rolled and cut ferrule, as shown in FIGS. 4A, 5B and 7C (example of an assembly with a connector connected to a coaxial cable). This jacket also may be formed by a shell or by two half-shells, as in FIG. 6A (example of an assembly with a connector connected to a twisted pair cable) or as in patent application FR 1761704 filed on 6 Dec. 2017 by the Applicant.

Thus, the invention basically involves replacing all the mechanical protection (corrugated tube, cover) and sealing (annular seals) parts that are mechanically fitted in electrical connection solutions, in particular for coaxial connection, of the prior art with a joint directly overmolded on the conductive jacket (ferrule, shell or two half-shells), partly inside the connector housing and around the part of the outer sheath of the cable that is near the housing.

The jacket, which is inside the housing and is arranged around outer and central contacts, allows leakage of HF signals that are likely to be transmitted by the coaxial cable inside the coaxial connector to be considerably and even fully limited.

This leakage is inherent with the stripping of the end of the central conductor of the coaxial cable to allow it to be crimped around the central contact of the connector.

After having analyzed the various solutions of the prior art for mechanical protection and sealing, the inventors have considered producing a joint by overmolding.

Furthermore, faced with the perceived risk of ingress of the overmolding material inside the connector through the natural gaps that are introduced, more specifically when the method for obtaining the jacket (ferrule) is through cutting/rolling, they have carefully considered using the jacket as a mechanical barrier against the injected material and selecting a low pressure overmolding method that allows full control of the overmolding conditions and thus ultimately of the spaces that are filled and that are not filled by the material.

By virtue of the invention, the cost of a coaxial assembly comprising a coaxial cable and a connector mounted on the cable is thus reduced, since the cost of producing various sealing and cable retention parts and of installing them is removed.

Furthermore, the overmolding method allows a plurality of cable diameters or of connector models to be accommodated without adding specific parts and/or modifying functional components. By way of an example, the cables may be of the 3.2 mm diameter RKT type, or even of the 2.6 mm diameter RG174 type.

Furthermore, installing an overmolded joint as a single sealing and cable retention element enables the spatial requirement of the coaxial assembly to be significantly reduced since:
- the overall length, i.e. the distance between the front end of the housing and the rear end of the overmolded joint may be significantly less than the distance with a cover and additional seal(s) or protection tube behind the connectors according to the prior art;
- the diameter of the overmolded joint also may be significantly reduced compared to a cover or protection tube that is added and mechanically fixed on the housing of the connector.

Finally, the overmolded joint, which may perfectly match the shapes of the connector housing and of the coaxial cable emerging therefrom, allows very high sealing and mechanical stress resistance performance levels to be obtained.

These very high performance levels make an electrical assembly according to the invention fully compatible with the USCAR and ISO standards of the motor vehicle field.

BRIEF DESCRIPTION OF THE FIGURES

The invention will be better understood upon reading the following detailed description of non-limiting embodiments of the invention, and with reference to the accompanying drawings, in which:

FIGS. 7A to 7G show a perspective view of the steps of producing an example of an elbow coaxial connection assembly according to the invention;

FIG. 8 shows a perspective view of another example of a female and straight coaxial connection assembly according to the invention.

DETAILED DESCRIPTION OF THE INVENTION

FIGS. 1 to 3A relating to coaxial connection assemblies according to the prior art have already been discussed in the preamble. Therefore, they will not be described hereafter.

For the sake of clarity, the same connection assembly element according to the prior art and according to the invention is denoted using the one and the same numeric reference.

Figure 4:
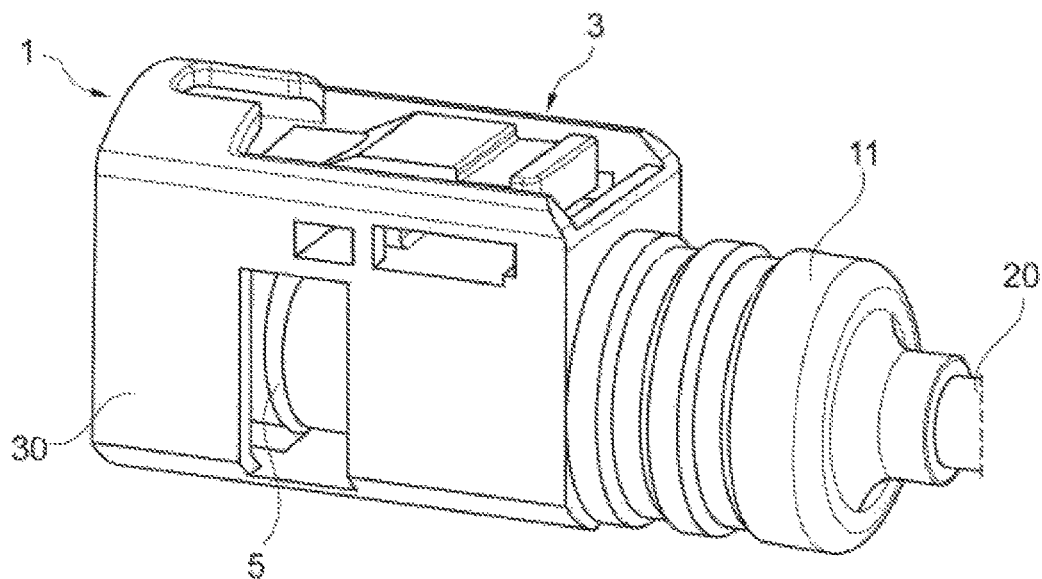
FIG. 4 shows a perspective view of an example of a male and straight coaxial connection assembly according to the invention.
Figure 4A:
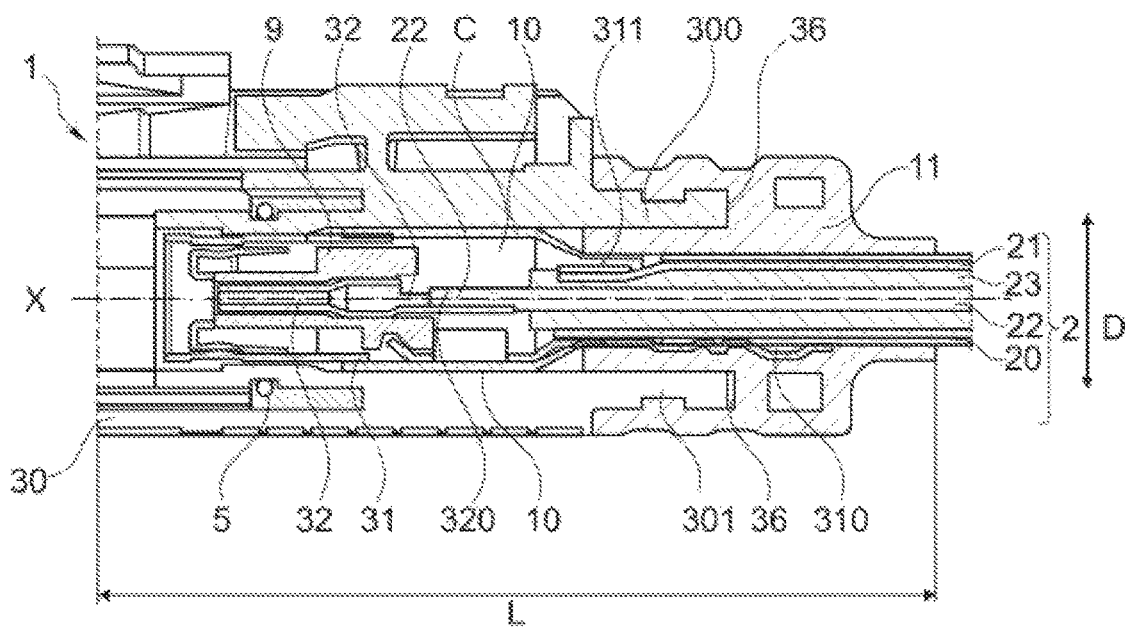
FIG. 4A is a longitudinal section view of FIG. 4.

FIGS. 4 and 4A show a straight coaxial connection assembly 1 according to the invention, comprising a coaxial cable 2 and a coaxial connector 3, which extends along a longitudinal axis X and which is mounted on the coaxial cable 2. In this example, the connector is a male connector.

The coaxial cable 2 normally comprises an outer insulating sheath 20 coaxially surrounding a metal shielding braid 21, which surrounds a dielectric 23, which surrounds the central conductor 22.

The straight coaxial connector 2 comprises an insulating housing 30 that is formed as a single part and is of elongated shape along the X axis, an outer contact 31 forming a ground contact is mounted and fixed in the housing 30, and a central contact 32 retained by an insulating body 9, which is retained in the outer contact 31.

More specifically, the outer contact 31 is mounted in the housing 30 with a portion 310 that is crimped around the outer sheath 20 of the coaxial cable 2. Furthermore, a portion 311 of the outer contact 31 is crimped around the metal shielding braid 21 of the cable 2 that surrounds the dielectric 23 thereof.

The central contact 32 is mounted inside the outer contact 31 with a portion 320 that is crimped around the free bare end of the central conductor 22 of the coaxial cable 2.

Inside the housing 30, a metal jacket 10 surrounds the central contact 32 and the outer contact 31 along the axis X, between the tubular part of the outer contact 31 and the portion 311 thereof that is crimped around the metal braid 21, by forming a substantially closed cavity C.

At the front of the connector 3, a seal 5 is mounted in the housing 30, so as to complete the seal with an additional connector once their mutual connection is complete.

According to the invention, in order to provide the mechanical protection and the seal on the rear part 300 of the housing 30, a joint 11 is overmolded between the jacket 10 and the rear part 300 of the housing and between the rear part 300 of the housing and part of the sheath 20 of the coaxial cable, by being distributed around said sheath and the rear part of the housing.

Overmolding of the joint 11 is carried out using a low pressure method, typically below 10 bar, with a polymer material that allows good chemical bonding, which is compatible with the constituent materials both of the sheath 20 of the cable 2 and of the housing 30, as well as good mechanical fastening. Furthermore, the overmolding material has features that are compatible, in terms of sealing and of mechanical resistance, with the USCAR and ISO standards of the motor vehicle field. For example, the overmolded material may be a polyamide, of the polyamide 6/6 type.

During the low pressure overmolding process, the jacket 10 acts as a physical barrier for preventing ingress of the overmolding material inside the cavity C.

In order to prevent any unwanted ingress of material while completely filling the target volume with the overmolding material, the inventors advantageously have implemented several measures.

Figure 5A:
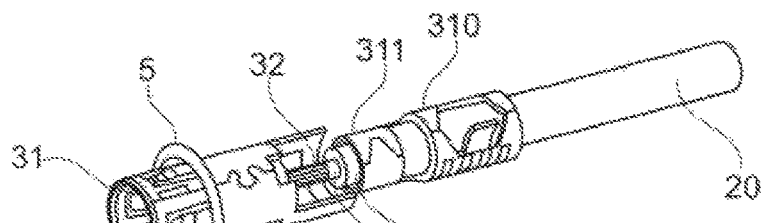
FIGS. 5A to 5D show a perspective view of the steps of producing a coaxial connection assembly according to the invention, as shown in FIGS. 4 and 4A.
Figure 5B:
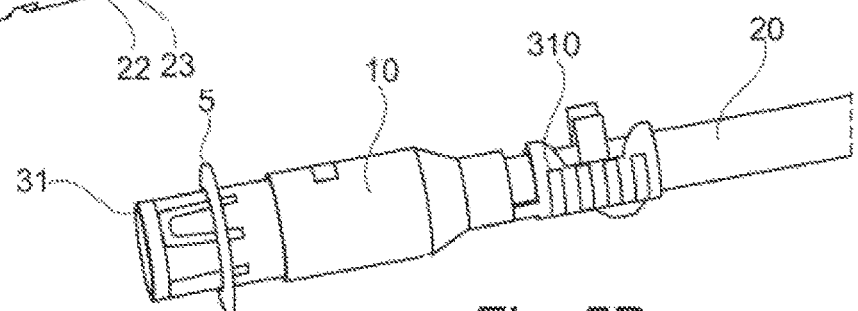
Figure 5C:
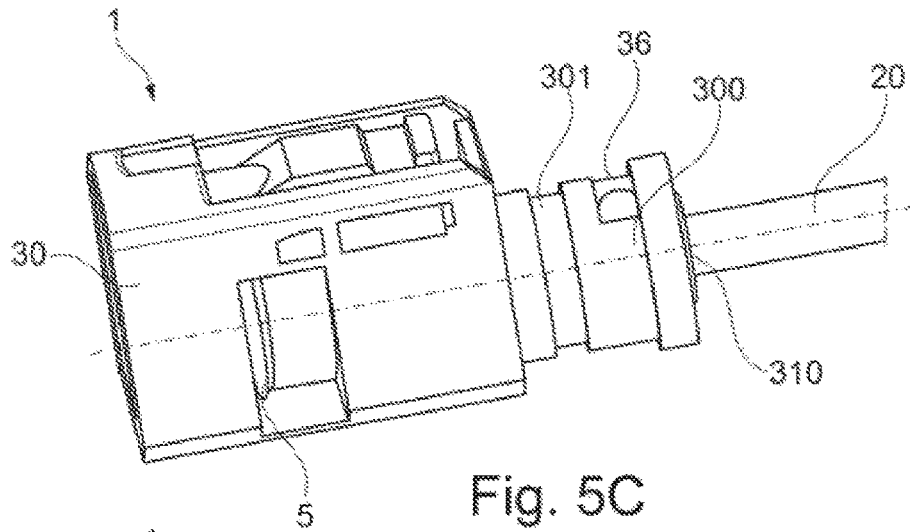

Firstly, as shown in FIGS. 4A and 5C, they have produced through-openings 36 in the housing 30, with these openings 36 to some extent forming vents for purging air when the overmolding material is injected, so that said material can fill and bond inside and around the rear part 300 of the housing 30. Furthermore, the presence of an annular groove 301 allows the fastening to be improved on the periphery of the rear part 300 of the housing 30.

Moreover, in order to properly manage the filling of the desired volume with the overmolding material, the inventors have implemented the low pressure method using three consecutive steps, as follows.

Firstly, initial injection of the polymer material was carried out using partial filling of the final volume defining the overmolded joint. Preferably, for the dimensions of the connectors according to the invention, the partial filling time may be less than 10 seconds with a partial filled volume equivalent to 60% of the final volume.

After a stoppage or waiting period, typically of approximately 10 to 15 seconds, the final injection of the polymer material was carried out, typically for 10 to 15 seconds, so as to complete the final volume defining the overmolded joint, that is an injection of approximately 40% of the final volume.

Figure 1:
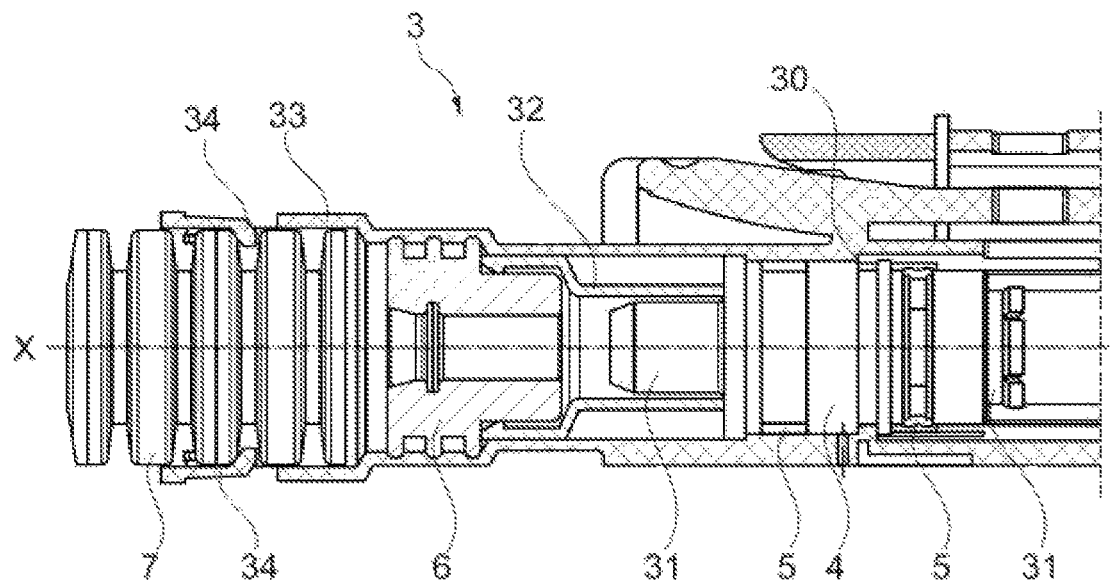
FIG. 1 shows a longitudinal section view of a straight coaxial connector according to U.S. Pat. No. 7,510,433 B2.
Figure 2:
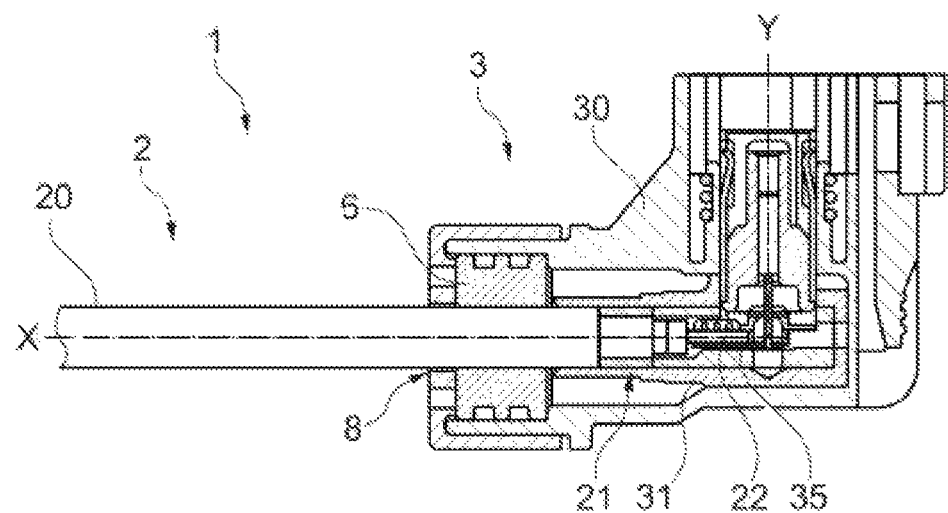
FIG. 2 shows a longitudinal section view of an elbow coaxial connection assembly according to patent application US 2018/0034172.
Figure 3:
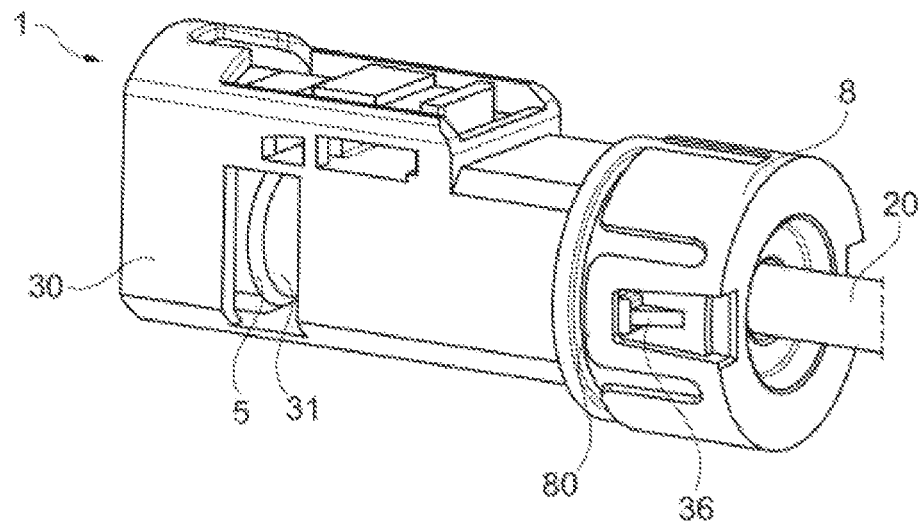
FIG. 3 shows a perspective view of a straight coaxial connection assembly according to the prior art.
Figure 3A:
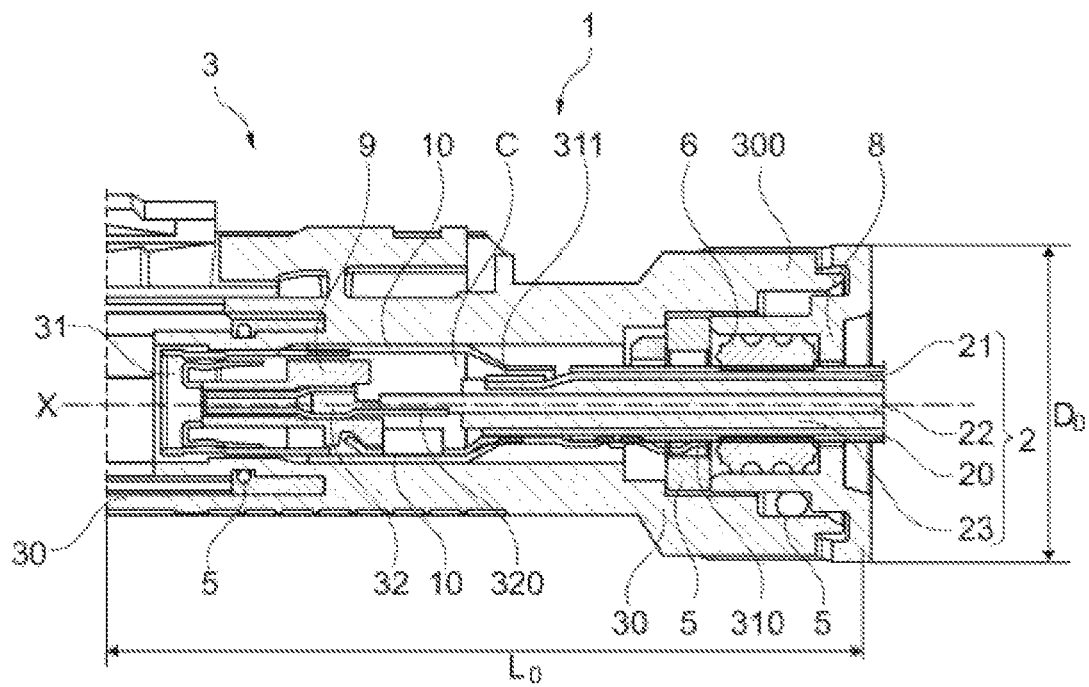
FIG. 3A is a longitudinal section view of FIG. 3.

Compared to a straight connection assembly 1 according to the prior art, as shown in FIGS. 3 and 3A, an assembly according to the invention has an overall length L between the front end of the housing 30 and the rear end of the joint 11 that is much less than the length L0. This length saving can exceed 20%. Similarly, the maximum diameter D of the joint 11 may be less than that of the protection cover 8 of FIGS. 3 and 3A.

Figure 5D:
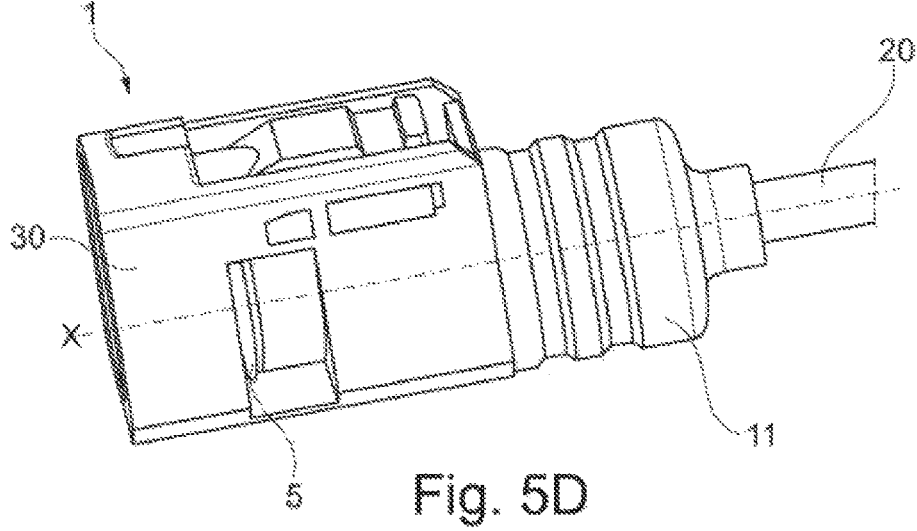

The method for producing a straight coaxial connection assembly 1 may be summarized as follows:

crimping of the outer contact 31, on the one hand, on the outer sheath 20 of the cable using the crimping portion 310 and, on the other hand, on the metal shielding braid 21 using the crimping portion 311 and crimping of the central contact 32 of the connector 3 on the central conductor of the cable 2 (FIG. 5A);

crimping of the jacket 10 around both the central contact 32 and the outer contact 31 by defining the substantially closed cavity C around the central contact 32, so as to limit HF signal leakage as much as possible (FIG. 5B);

assembly and mechanical retention of the sub-assembly that is crimped around the cable 2 inside the housing 30 (FIG. 5C);

production of the mechanical protection and sealing joint 11 using low pressure overmolding (FIG. 5D).

The production of an overmolded joint 11 according to the invention also may by applicable to elbow connectors, particularly elbow connectors with housings 3 in two parts, i.e. a housing body 37, also called "coding housing", and a curved sleeve 38 mechanically assembled in the body 37, as disclosed in U.S. Pat. No. 8,182,285 by the Applicant, for example.

Figure 6:
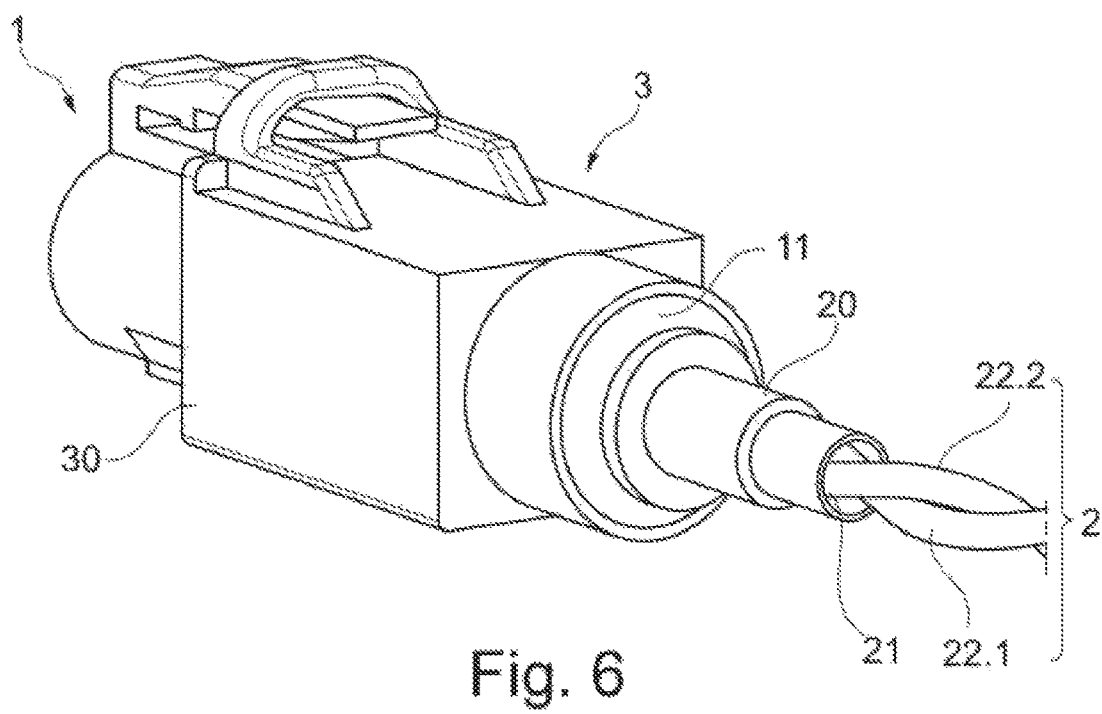
FIG. 6 shows a perspective view of an example of a straight twisted pair connection assembly according to the invention.
Figure 6A:
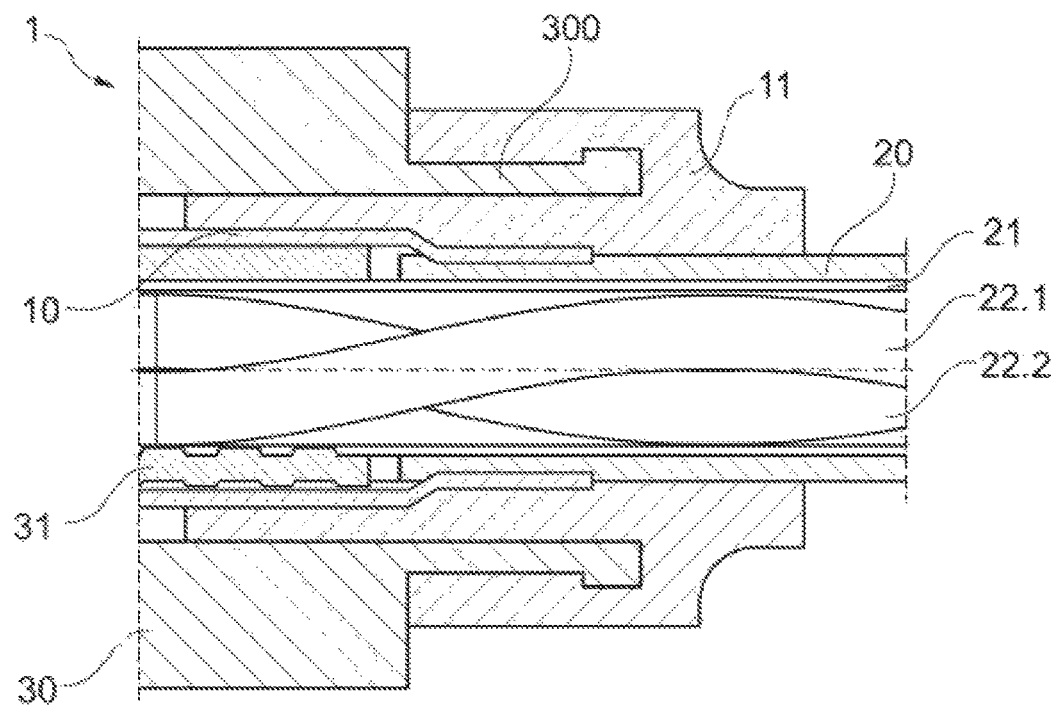
FIG. 6A is a longitudinal section view of FIG. 6.

FIGS. 6 and 6A show another example of a connection assembly according to the invention. In this case, the electric cable is formed by a pair of twisted central conductors 22.1, 22.2, each insulated by a dielectric. A metal shielding braid 21 surrounds the pair of twisted conductors 22.1, 22.2. An outer insulating sheath 20 surrounds the shielding braid 21.

In this other example, still with the intention of providing the mechanical protection and the seal on the rear part 300 of the housing 30, a joint 11 is overmolded between the jacket 10 and the rear part 300 of the housing and between the rear part 300 of the housing and part of the sheath 20 of the twisted pair cable, by being distributed around said cable and the rear part of the housing.

Thus, with reference to FIGS. 7A to 7G, the production, according to the invention, of an example of an elbow shaped assembly 1 is described.

Figure 7A:
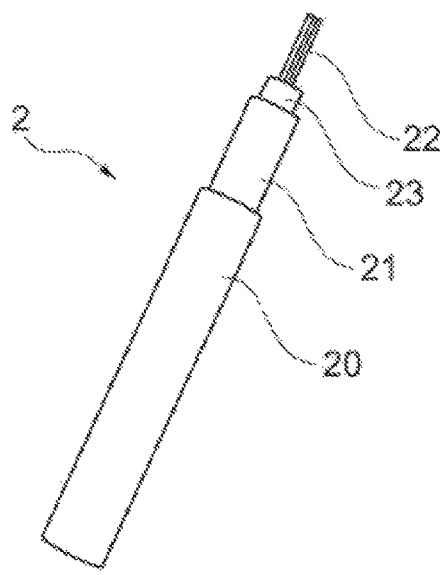

The end of a central conductor 22 of a coaxial cable 2 is stripped by also exposing the metal braid 21 over a sufficient length (FIG. 7A).

Figure 7B:
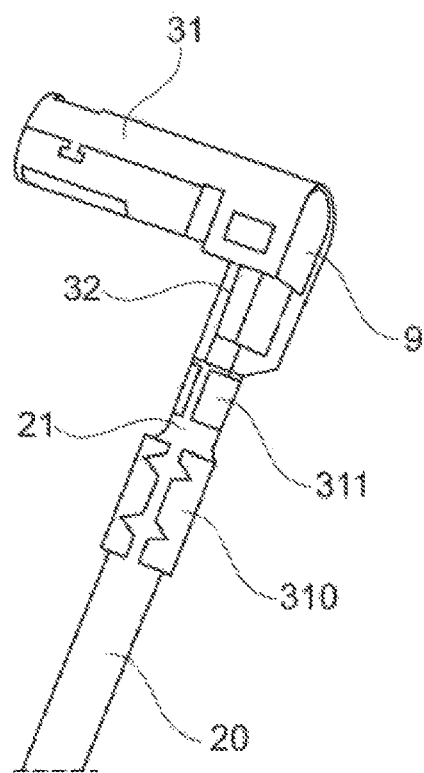

Then, a curved outer contact 31 is crimped, on the one hand, on the outer sheath 20 of the cable using the crimping portion 310 and, on the other hand, on the metal shielding braid 21 using the crimping portion 311 and the central contact 32 of the connector 3 is crimped on the central conductor of the cable 2 (FIG. 7B).

Figure 7C:
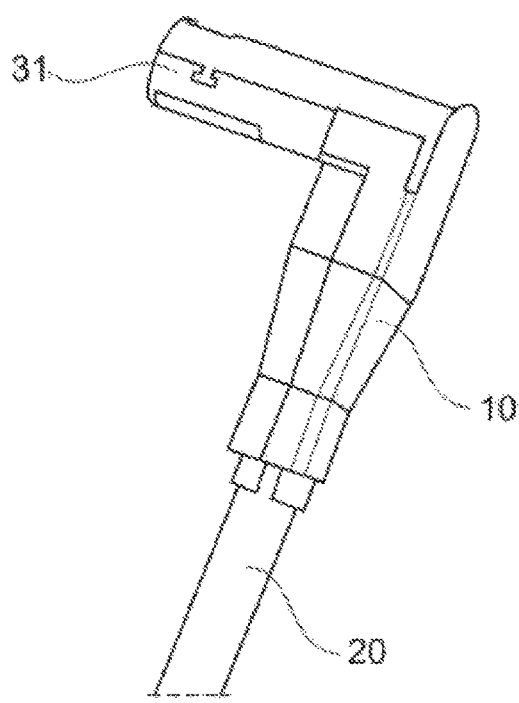

A jacket 10 is then crimped around both the central contact 32 and the curved outer contact 31 by again defining a substantially closed cavity C around the central contact 32, so as to limit HF signal leakage as much as possible (FIG. 7C).

Figure 7D:
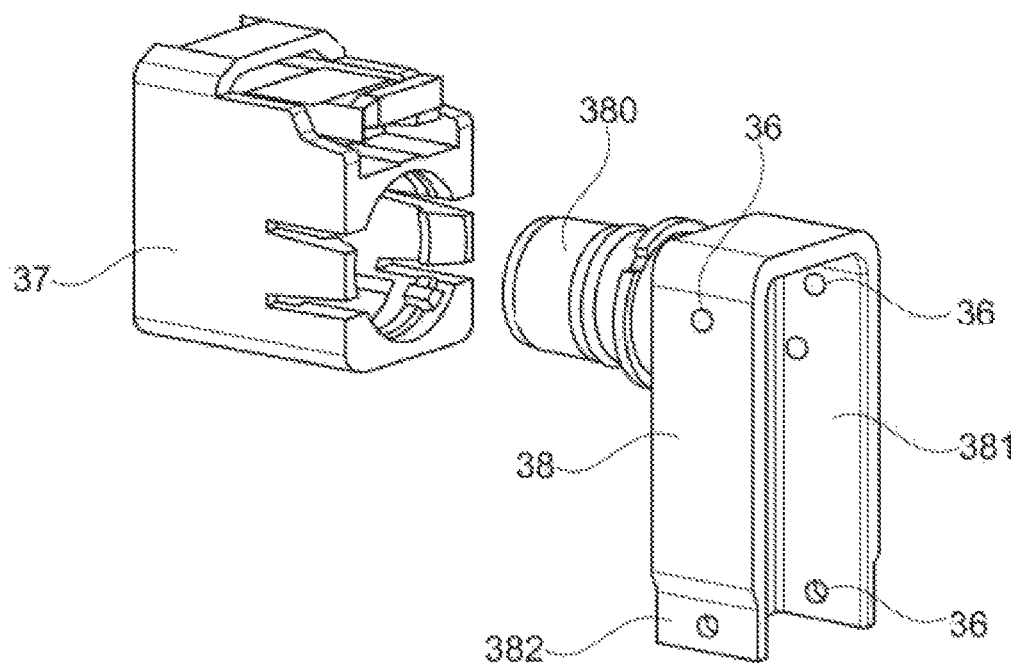
Figure 7E:
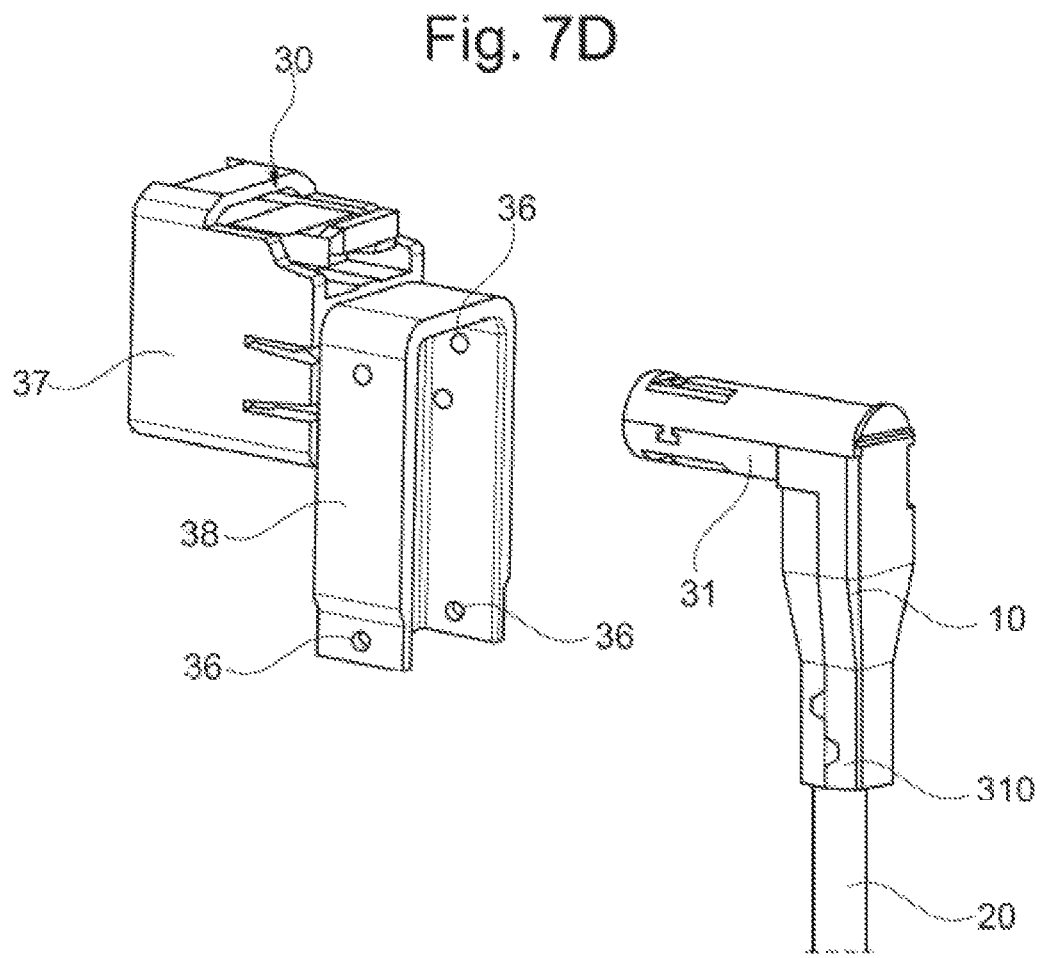

At the same time, a housing 30 (also called sub-assembly) for the connector is produced by snap-fitting a curved sleeve 38 inside a straight coding housing 38 (FIG. 7D). The coding housing 37 extends along a longitudinal axis Y defining, with the axis X, the angle of the curve. The sleeve 38 comprises a tubular part 380 along the Y axis and a hollow 381 along its longitudinal axis X, with the hollow being in the general shape of a U when viewed from above.

Then, both the straight part of the previously crimped sub-assembly that extends along the X axis inside the U-shaped hollow 381 of the sleeve 38 and the other straight part of the sub-assembly that extends along the Y axis in the tubular portion 380 (FIGS. 7E, 7F) are accommodated and mechanically retained.

The curved assembly 1 is then finished by producing the mechanical protection and sealing joint 11 according to the invention using low pressure overmolding (FIG. 7G).

As shown in FIG. 7G, the joint 11 is overmolded between the jacket 10 and the internal space of the hollow 381 of the sleeve by closing said sleeve around part of the sheath 20 of the coaxial cable and the periphery of the sleeve in the vicinity of grooves 382 in the sleeve 38. As is the case for the straight connection assembly, provision advantageously may be made for through-openings 36 forming vents, as well as for grooves 382, to be produced in the sleeve 38, so as to ensure that air is properly purged when overmolding material is injected and to provide good mechanical fastening thereby.

The overmolded protection and sealing joint 11 according to the invention may be applied to all types of straight or elbow connectors, in particular to connector types that are already marketed, particularly the female (FIGS. 4, 4A, 5D, 7G) or male (FIG. 8) connectors marketed by the Applicant under commercial reference "R3C", but also to twisted pair type connectors (FIGS. 6, 6A).

Of course, the invention is not limited to the previously described embodiments.

Other variations and improvements may be contemplated without necessarily departing from the scope of the invention.

For example, any overmolded joint profile that differs from those illustrated may be contemplated on the basis of a low pressure overmolding method.

Even though it is not shown in the figures, the invention also allows universal housings made as a single part to be used for the straight connectors or made up of two parts (sleeve and coding housing) to be used for the elbow connectors. These universal housings may fully comply with the color coding and keying system for applications of the motor vehicle field, whereby a combination of colors allows a single connection to be made between a male connector and a female connector for the same type of connection (GPS, wireless, e.g. Bluetooth®, "Digital Audio Broadcasting" (DAB), Wi-Fi, ADAS, protocol, etc.).

The invention claimed is:

1. Electrical connection assembly comprising:
    an electric cable comprising:
        at least one central conductor;
        an electrically insulating outer sheath surrounding the central conductor(s);
    an electrical connector comprising:
        a housing;
        an outer contact (extending along at least one longitudinal axis (X), the outer contact being mounted in the housing;
        at least one central contact extending at least along the longitudinal axis (X), the central contact(s) being mounted inside the outer contact with interpositioning of an electrically insulating body, the central contact(s) being provided with at least one portion that is crimped around the bare free end of the central conductor(s) of the cable;
        an electrically conductive jacket surrounding the inside of the housing, the central contact(s) and the outer contact at least over the length, along the X axis, of the portion that is crimped around the free crimped end of the central conductor(s), by forming a cavity that is practically or fully closed;
    a sealing and mechanical retention joint overmolded both between the jacket and a part of the housing, between the housing part and part of the sheath of the cable, and around said parts.

2. Electrical connection assembly according to claim 1, wherein the cable and the connector are coaxial.

3. Electrical connection assembly according to claim 1, wherein the cable is formed by one or more pairs of twisted central conductors.

4. Electrical connection assembly according to claim 1, wherein the cavity is devoid of the material of the overmolded joint.

5. Electrical connection assembly according to claim 1, wherein the housing part comprises one or more through-opening(s) completely filled by the overmolded joint.

6. Electrical connection assembly according to claim 1, wherein:
    the electric cable comprises, around at least one central conductor, a dielectric and a metal shielding braid surrounding the dielectric and surrounded by the outer sheath;
    the outer contact comprises a portion that is crimped around the outer sheath of the cable and/or a portion that is crimped around the metal braid of the cable;
    the jacket also surrounds the central contact and the outer contact over the length of the portion that is crimped around the metal braid.

7. Electrical connection assembly according to claim 1, wherein the outer contact is formed by the one and the same part that is obtained by cutting and rolling a metal strip.

8. Electrical connection assembly according to claim 1, wherein the jacket is formed by the one and the same part that is obtained by cutting and rolling a metal strip.

9. Electrical connection assembly according to claim 1, wherein:
    the connector housing is formed by a single straight part extending along the longitudinal axis (X);
    the joint is overmolded between the jacket and the rear part of the housing and between the rear part of the housing and part of the sheath of the electric cable by being distributed around said cable and the rear part of the housing.

10. Electrical connection assembly according to claim 1, wherein:
    the connector is elbow shaped with an elbow between the longitudinal axis (X) and another longitudinal axis (Y), preferably 90° relative to each other;
    the connector housing comprising:
        a coding housing extending along the other longitudinal axis (Y);
        a curved sleeve with the same elbow shape as that of the connector, the sleeve being assembled with the housing body, the sleeve housing the jacket;
    the joint is overmolded between the jacket and the inner space of the sleeve by closing said sleeve around part of the sheath of the electric cable.

11. Electrical connection assembly according to claim 10, wherein the sleeve is assembled with the coding housing along a pivot link around the other axis (Y).

12. Method for producing an electrical connection assembly, comprising the following steps:
    a/ supplying an electrical connection assembly comprising:

an electric cable comprising:
  at least one central conductor;
  an electrically insulating outer sheath surrounding the central conductor(s);
an electrical connector comprising:
  a housing;
  an outer contact extending along at least one longitudinal axis (X), the outer contact being mounted in the housing;
  at least one central contact extending at least along the longitudinal axis (X), the central contact(s) being mounted inside the outer contact with interpositioning of an electrically insulating body, the central contact(s) being provided with at least one portion that is crimped around the bare free end of the central conductor(s) of the cable;
  an electrically conductive jacket surrounding the inside of the housing, the central contact(s) and the outer contact at least over the length, along the X axis, of the portion that is crimped around the free crimped end of the central conductor(s), by forming a cavity that is practically or fully closed;
  b/ producing an overmold made of at least one polymer material, using a technique called low pressure overmolding, both between the jacket and part of the housing, between the housing part and part of the cable sheath, and around said parts.

13. Method according to claim 12, wherein the step b/ is implemented so that the cavity is devoid of the polymer material of the overmold.

14. Method according to claim 12, wherein the step b/ is implemented as follows:
  b1/ initial injection of the polymer material based on partial filling of the final volume defining the overmolded joint;
  b2/ stopping the injection of b1/;
  b3/ final injection of the polymer material, so as to complete the final volume defining the overmolded joint.

* * * * *